United States Patent [19]

Yoshida et al.

[11] 4,172,285

[45] Oct. 23, 1979

[54] KEY-OPERATED PROGRAM CALCULATOR

[75] Inventors: Hideo Yoshida; Tetsuo Myooi, both of Nara, Japan

[73] Assignee: Sharp Kabushiki Kaisha, Osaka, Japan

[21] Appl. No.: 809,707

[22] Filed: Jun. 24, 1977

[30] Foreign Application Priority Data

Jun. 25, 1976 [JP] Japan .................................. 51-76287

[51] Int. Cl.² .......................... G06F 15/30; G09B 7/02; G06K 15/20
[52] U.S. Cl. ..................................... 364/443; 35/48 B; 235/379; 364/400; 340/366 R
[58] Field of Search ............... 364/443, 444, 445, 406; 35/48 B; 235/495, 379, 92 DM, 375, 376, 380, 400; 340/366 R, 366 A, 366 B, 366 CA, 366 D

[56] References Cited

U.S. PATENT DOCUMENTS

| | | | |
|---|---|---|---|
| 3,573,442 | 4/1971 | Andeen | 364/444 |
| 3,783,257 | 1/1974 | Friedman | 235/92 DM |
| 3,836,690 | 9/1974 | Purtle | 364/444 |
| 3,845,277 | 10/1974 | Voss | 364/406 |
| 3,860,795 | 1/1975 | Morrill | 235/495 |
| 3,967,098 | 6/1976 | Harnagel | 364/443 |
| 3,973,237 | 8/1976 | Sawaguchi | 235/379 |

*Primary Examiner*—Robert M. Kilgore
*Attorney, Agent, or Firm*—Birch, Stewart, Kolasch and Birch

[57] ABSTRACT

A key-operated digital program calculator is adapted to receive in succession a plurality of different kinds of input data items and perform a specified program calculation thereupon. The calculator is further provided with a display capable of visually displaying which kinds of input data items to be entered thereinto, whereby the operator is visually informed of the kinds of input data items to be next introduced into the calculator.

3 Claims, 13 Drawing Figures

| # | Key | X | W | Z | V | Y | M1 | M2 | M3 | DISPLAY | |
|---|---|---|---|---|---|---|---|---|---|---|---|
| 1 | SRT | | | | | | | | | H [ ] | |
| 2 | C | h | | | | | | | | H 0. | 0→X |
| 3 | | 0 | | | | | | | | h | h→X |
| 4 | IS | d | | | | | | | | d 0. | X→M1 |
| 5 | | d | | | | | | | | d d | |
| 6 | SW | 0 | | | | | | | | d 0. | X→M2 |
| 7 | IS | - | | | | | | | d | - d | |
| 8 | | - | | | | | | | d | - - | |
| 9 | NE | - | | | | | | | d | - - | |
| 10 | IS | d−1 | | | | | | | d | - - | X→M3 |
| 11 | | Cos(d−1) | | | | Cos(d−1) | | d | - | - - | M2−M3→X(M2→X, X−W→X) |
| 12 | | Cos(d−1) | | | | Cos(d−1) | | d | - | - - | Cos routine |
| 13 | | h | | | | Cos(d−1) | | d | - | - - | X→Y |
| 14 | | cosh | | | | Cos(d−1) | | d | - | - - | M1→X |
| 15 | | h | | | | Cos(d−1) | | d | - | - - | Cos routine |
| 16 | | Sinh | | | | Cos(d−1) | | d | - | - - | X↔M1 |
| 17 | | - | | | | Cos(d−1) | | d | - | - - | Fss set or reset |
| 18 | | 1+cosh | | | | Cos(d−1) | | d | - | - - | 1→X |
| 19 | | A=(1+cosh)cos(d−1) | | | | Cos(d−1) | | d | - | - - | X+M1→X(M1→W, X+W→X) |
| 20 | | A | 1 | | | A | | d | - | - - | XY→X(Y→W, XW→X) |
| 21 | | A | | | | A | | d | - | - - | X→Y |
| 22 | | d | | | | | | d | - | - - | M2→X, M3→W |

| # | | X | W | Z | V | Y | M₁ | M₂ | M₃ | DISPLAY | |
|---|---|---|---|---|---|---|---|---|---|---|---|
| 23 | | $d+1$ | | | | A | | | — | — | $X+W \to X$ |
| 24 | | $\cos(d+1)$ | | | | A | | | — | — | Cos routine |
| 25 | | $\cosh$ | $\cosh$ | | | A | | | — | — | $X \leftrightarrow M_1$ |
| 26 | | $1$ | | | | A | | | — | — | $1 \to X$ |
| 27 | | $-1+\cosh$ | | | | A | | | — | — | $-X+W \to X$ |
| 28 | | $B=(-1+\cosh)\cos(d+1)$ | | | | A | | | — | — | $XM_1 \to X$ |
| 29 | | $A+B$ | | | | A | | $d$ | — | — | $X+Y \to X$ |
| 30 | | $\dfrac{A+B}{2}$ | | | | A | | $d$ | — | — | $X/2 \to Y$ |
| 31 | | $a_c = \sin^{-1}\dfrac{A+B}{2}$ | | | | A | | $d$ | — | $\sqcap a_c$ | Sin⁻¹ routine |
| 32 | [S] | $a_c$ | | | | A | | $d$ | — | — | $X \to M_1$ |
| 33 | | $a_c'$ | | | | A | | $d$ | — | — | DMSX |
| 34 | | $d$ | | | | A | | $a_c'$ | — | — | $X \leftrightarrow M_2$ |
| 35 | | $\sin d$ | | | | A | $2\sin d$ | $a_c'$ | — | — | Sin routine |
| 36 | | $2\sin d$ | | | | A | $2\sin d$ | $a_c'$ | — | — | $2X \to X$ |
| 37 | | $a_c$ | | | | A | $2\sin d$ | $a_c$ | — | — | $X \leftrightarrow M_1$ |
| 38 | | $a_c$ | | | | A | $2\sin d$ | $a_c$ | — | — | $X \to M_2$ |
| 39 | | $a_c+1$ | | | | A | $2\sin d$ | $a_c$ | — | — | $X+M_3 \to X$ |
| 40 | | $\cos(a_c-1)$ | | | | A | $2\sin d$ | $a_c$ | — | — | Cos routine |
| 41 | | $C=\cos(a_c-1)$ | | | | $\cos(a_c+1)$ | $2\sin d$ | $a_c$ | — | — | $X \to Y$ |
| 42 | | $C+2\sin d$ | | | | $\cos(a_c+1)$ | $2\sin d$ | $a_c$ | — | — | $X+M_1 \to X$ |
| 43 | | $C+2\sin d$ | | | | $\cos(a_c+1)$ | $C+2\sin d$ | $a_c$ | — | — | $X \to M_1$ |
| 44 | | $a_c-1$ | | | | $\cos(a_c+1)$ | $C+2\sin d$ | $a_c$ | — | — | $M_2-M_3 \to X$ |

| | X | W | Z | V | Y | M1 | M2 | M3 | DISPLAY | |
|---|---|---|---|---|---|---|---|---|---|---|
| 45 | D=Cos(ac−1) | | | | Cos(ac+1) | C+2Sind | ac | — | | Cos routine |
| 46 | Cos(ac−1) | Cos(ac+1) | | | Cos(ac+1) | C+2S sind | ac | — | | Y→W |
| 47 | Cos(ac−1) | Cos(as+1) | | | Cos(ac−1) | C+2S sind | ac | — | | X→Y |
| 48 | C+D | | | | Cos(ac−1) | C+2S sind | ac | — | | X+W→Y |
| 49 | Cos(ac−1) | | | | C+D | C+2S sind | ac | — | | X↔Y |
| 50 | Cos(a−1) | | | | C+D | C+2S sind | ac | — | | M1→W |
| 51 | C−2S sind−D | | | | C+D | C+2S sind | ac | — | | −X+W→X |
| 52 | $\frac{C+2S\ sind-D}{C+D}$ | | | | C+D | C+2S sind | ac | — | | X/Y→X |
| 53 | $Cos^{-1}\frac{C+2S\ sind-D}{C+D}$ | | | | C+D | C+2S sind | ac | — | | Cos⁻¹x |
| 54 | ac | | | | C+D | C+2S sind | $Cos^{-1}\frac{C+2Sind-D}{C+D}$ | — | | X↔M2 |
| 55 | ac' | | | | C+D | C+2S sind | $Cos^{-1}\frac{C+2Sind-D}{C+D}$ | — | | DMSX |
| 56 | ac' | | | | ac' | C+2S sind | $Cos^{-1}\frac{C+2Sind-D}{C+D}$ | — | | X↔Y |
| 57 | $Cos^{-1}\frac{C+2S\ sind-D}{C+D}$ | | | | ac' | C+2S sind | ac' | — | | X↔M2 |
| 58 | Zn | | | | ac' | C+2S sind | ac' | — | =Zn | |
| 59 IS | ac' | | | | Zn | C+2S sind | ac' | — | R ac | DMSX |
| 60 IC | Zn' | | | | ac' | C+2S sind | ac' | — | =Zn | X↔Y |
| | | | | | | | | | | X↔Y |

FIG. 7C

↑ ↑ ↑
input/ abb. symbol
output display (minus error)    numeric
distinction

FIG. 8

↑ ↑
input/  abbre. decimal         numeric
output  code    point
code            code

KEY-OPERATED PROGRAM CALCULATOR

BACKGROUND OF THE INVENTION

The present invention pertains to a key-operated calculator, and more particularly to a key-operated program calculator capable of performing a specific program calculation in response to sequentially entered plural kinds of input data items.

Most of key-operated calculators, for example, calculators storing a plurality of kinds of fixed programs and programmable calculators, needs a plurality of kinds of input data items rather than a single kind of input data item to perform a specific program calculation (that is, complicated calculations except for four rule operations).

In this case, the orders of entering the input data items are previously determined in advance in accordance with desired program calculations and therefore the operator must learn in advance the respective orders of manual operations of keys. This means that the operator shall introduce desired input data items into calculators while keeping in mind the orders of manual operations of keys. Such a requirement is very troublesome to the operator and may cause operator's errors in the entry of input data.

Therefore, it is an object of the present invention to provide an improved display means effective to key-operated calculators which performs a specific program calculation in response to sequentially applied input data items. According to the improved display means of the present invention, certain kinds of input data items to be entered are visually displayed in the form of its abbreviations, thereby visually indicating to the operator the kinds of input data items which must be next introduced.

By way of example, in electronic calculators containing a plurality of kinds of fixed programs, the present invention is practiced in the following manner.

1. While performing a fixed program calculation, the specific kinds of input data items which must be next introduced are visually displayed in the form of abbreviations through the utilization of a specific digit element of a multi-digit segment type display.

2. Kinds of input data items being currently introduced are visually displayed in the form of abbreviations through the utilization of a specific digit element of a multi-digit segment type display.

3. Kinds of calculation results are visually displayed in the form of its abbreviations by utilization of a specific digit element of a multi-digit segment type display.

BRIEF DESCRIPTION OF THE DRAWINGS

Other objects and novel features of the present invention are set forth in the appended claims and the present invention as to its organization and its mode of operation will best be understood from a consideration of the following detailed description of the preferred embodiments taken in connection with the accompanying drawings, wherein:

DETAILED DESCRIPTION OF THE INVENTION

Figures 1, 2:
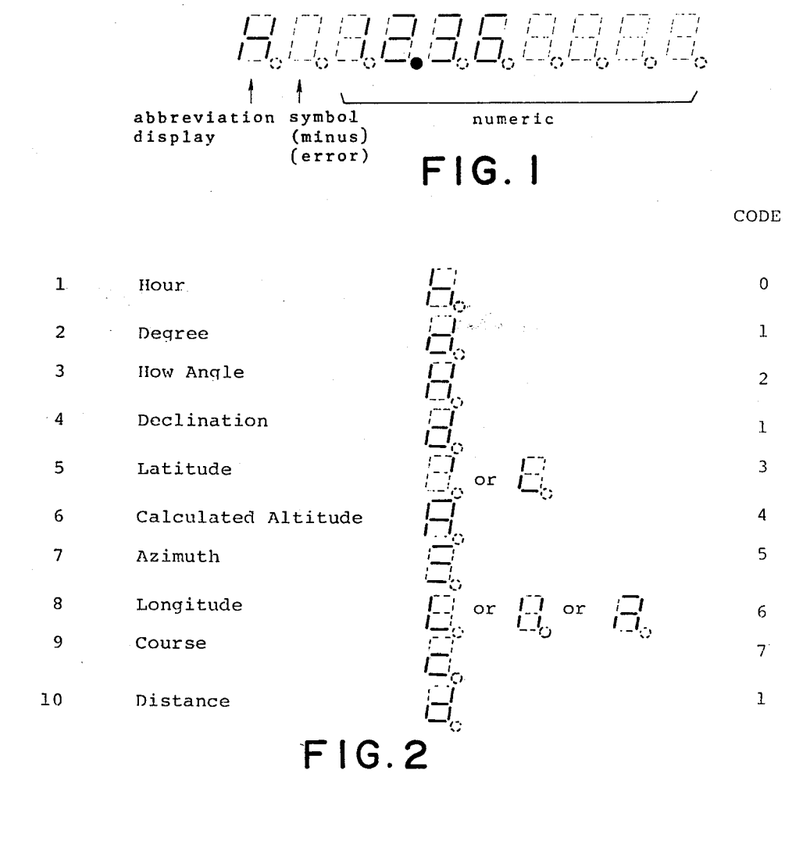
FIG. 1 is a simplified diagram showing one preferred form of a visual display provided in accordance with the present invention.
FIG. 2 is a table illustrating a relationship between kinds of input data items and its associated abbreviations and decimal codes used with the example shown in FIG. 1.

As illustrated in FIG. 1, an example of a digital display embodying the present invention is of the ten-digit segment type which provides a visual display about numeric information on its lower eight digit positions, symbol information (for example, minus symbol and error alarm) on its ninth digit position and abbreviation information (as set forth in the foregoing paragraph) on its tenth digit position.

An electronic calculator used with the digital display as illustrated in FIG. 1 contains a plurality of kinds of fixed programs for execution of complicated calculations and in more detail contains a plurality of astro-navigation calculation programs required while sailing as follows.

1. A first fixed calculation program which computes most probable position (calculated altitude and azimuth) upon receipt of hour angle, declination and estimated latitude as input data items.

2. A second fixed calculation program which computes arrive latitude and arrive longitude as a function of depart latitude, depart longitude, course and distance.

3. A third fixed calculation program which calls forth course and distance in accordance with depart latitude, depart longitude, arrive latitude and arrive longitude.

40 A fourth fixed calculation program which calls forth course and distance by Great-circle sailing in accordance with input data items about depart latitude, depart longitude, arrive latitude and arrive longitude.

The above-said calculator is further provided with time calculation functions and arc calculation functions. While sexagesimal calcuations are performed on units of hours, minutes and seconds in accordance with the former, sexagesimal calculations are performed on units of degrees, minutes and tenths of minutes in accordance with the latter.

Columns 3 through 10 of FIG. 2 show a relationship between the above-said four fixed programs and their associated input data items, displaying contents, abbreviations and decimal codes. An abbreviation as defined in column 1 is visually displayed on the tenth digit position during execution of the time calculations, while an abbreviation as defined in column 2 is displayed during execution of the arc calculations.

Figure 3:
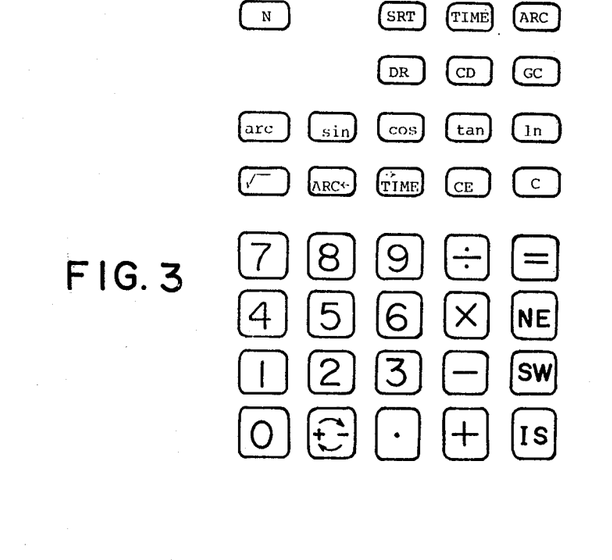
FIG. 3 is a layout of a keyboard unit used with the example shown in FIG. 1.

A layout of a keyboard unit used with the astro-navigation calculator as briefly discussed is illustrated in FIG. 3, wherein:

| Key | Description |
|---|---|
| [0], [1], ... [9]: | numeric keys |
| [.]: | a decimal point key |
| [+], [−], [×], [÷], [=]: | arithmetic function keys |
| [N]: | a key designating a normal four-rule decimal calculation mode |
| [SRT]: | a first program selection key |
| [DR]: | a second program selection key |
| [CD]: | a third program selection key |
| [GC]: | a fourth program selection key |
| [TIME]: | a key designating a sexagesimal calculation on hours, minutes and seconds (time calculation) |
| [ARC]: | a key designating a sexagesimal calculation on degrees, minutes and tenths of minutes (arc calculation |
| [sin], [cos], [tan]: | trigonometric calculation keys |
| [arc]: | inverse-trigonometric calculation keys (when consecutively operating arc and sin after entry of numeric N, the $\sin^{-1}$ will be called for) |
| [ℓn]: | a natural logarithm calculation key |
| [√]: | a square root calculation |
| [ARC←]: | a time to arc conversion key (converts time representation into arc representation under the assumption that 24 hours are equal to 360 degrees, and switches into the arc calculation mode) |
| [→TIME]: | an arc to time conversion key (the functions of this key are reverse to the above-said key [ARC←]) |
| [CE]: | a clear entry key |
| [C]: | a clear key |
| [+ −]: | a sign change key |
| [NE]: | a key designating that presently introduced numeric is pertinent to the north lattitude or the east longitude when introducing lattitude or longitude information |
| [SW]: | a key designating that presently introduced numeric is pertinent to the south lattitude or the west longitude when introducing lattitude or longitude information |
| [IS]: | this key has the following functions: 1. It designates any partition between input data items when it is manually depressed every entry of each of the input data items after selection of a specific program (for example, a fixed program calling for two kinds of operation results). 2. In connection with the above, it indicates execution of the program calculation calling for the first of the two operation results in response to the manual depression thereof following entry of the last data item. 3. Then, it initiates execution of the other program calculation calling for the second of the two operation results in response to the manual depression thereof after obtaining the first operation result. 4. Finally, it permits the first result and the second result to be alternatively displayed in response to the manual depression thereof. |

Figure 4:
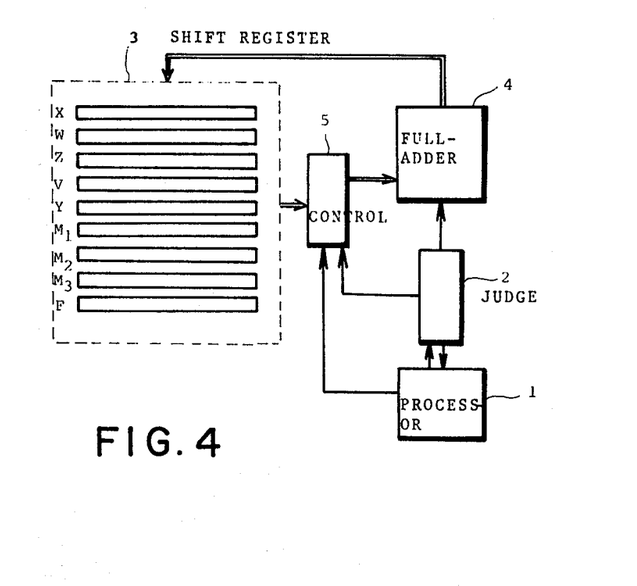
FIG. 4 is a block diagram illustrating the scheme of a circuit arrangement used with the example shown in FIG. 1.

FIG. 4 illustrates a block diagram of a circuit construction of the preferred form of the present invention.

There are illustrated a processor 1 comprising a read-only memory and an address selection circuit, a judgement circuit 2, a shift register region comprising arithmetic registers X, W, Z, V, temporary storages Y, M$_1$, M$_2$, M$_3$ and a flag register F, a full-adder/subtractor 4, and a controller controlling the contents of the respective registers 3 in accordance with instructions from the processor 1 and outputs from the judgement circuit 2.

Figure 5:
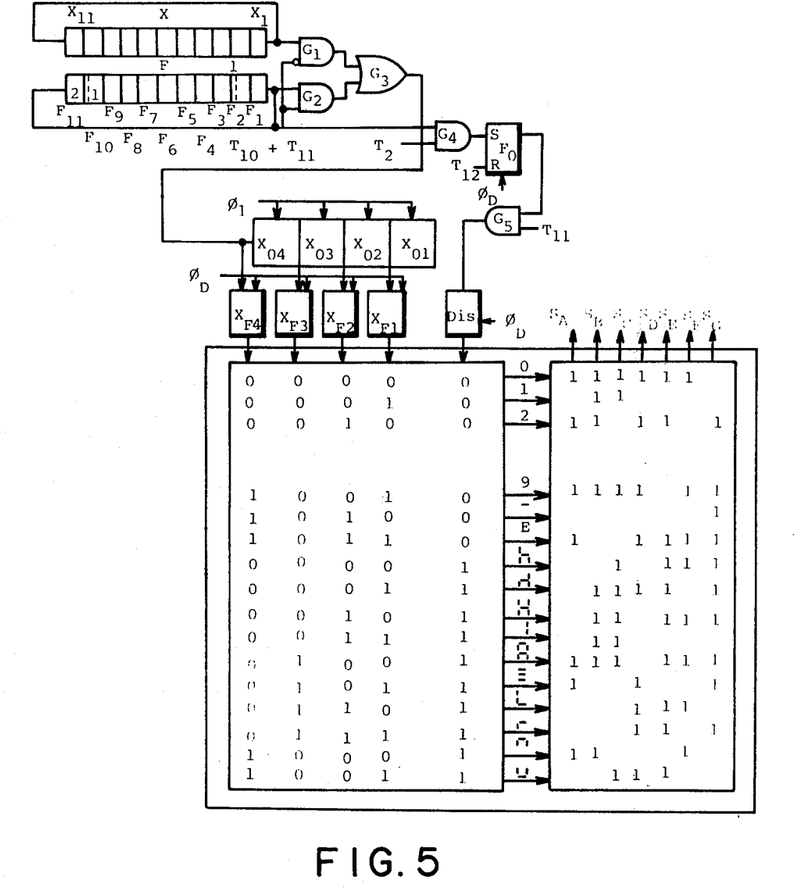
FIG. 5 is a circuit diagram illustrating a display register X, a flag register F and a display decoder.
Figure 6:
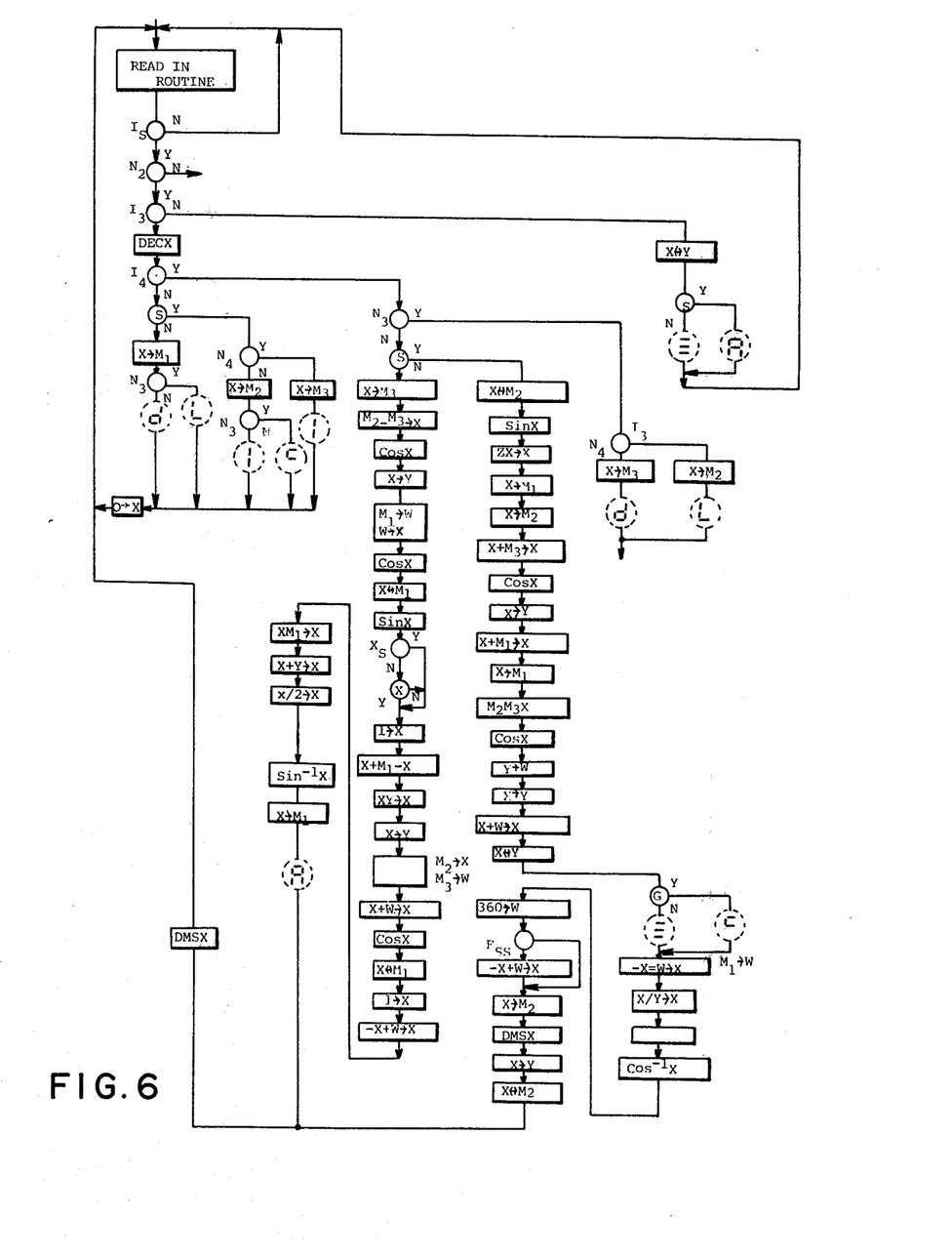
FIGS. 6, 6A and 6B are flow charts for explanation of execution of a specific fixed program calculation in accordance with the present invention.
Figure 6A:
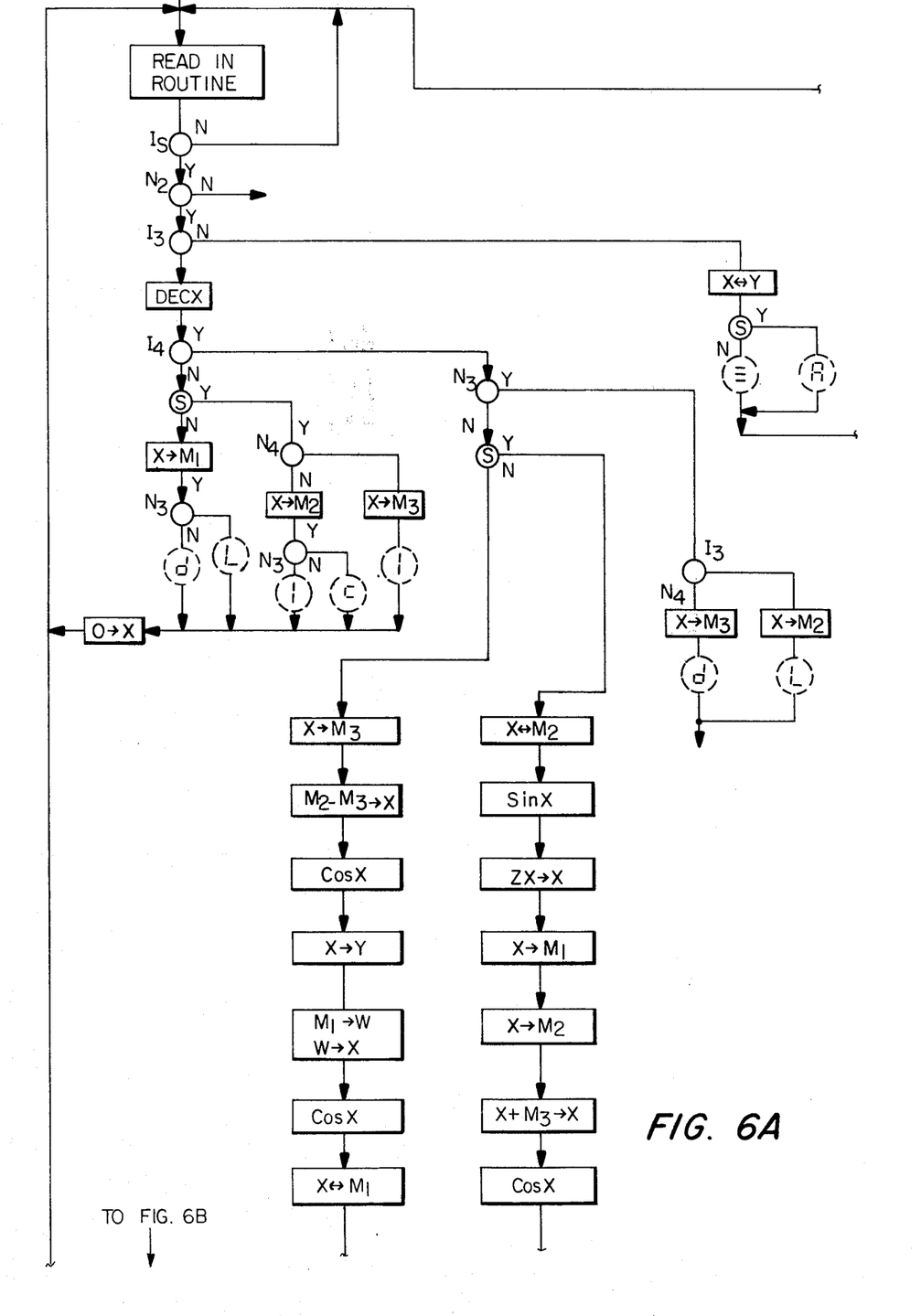
Figure 6B:
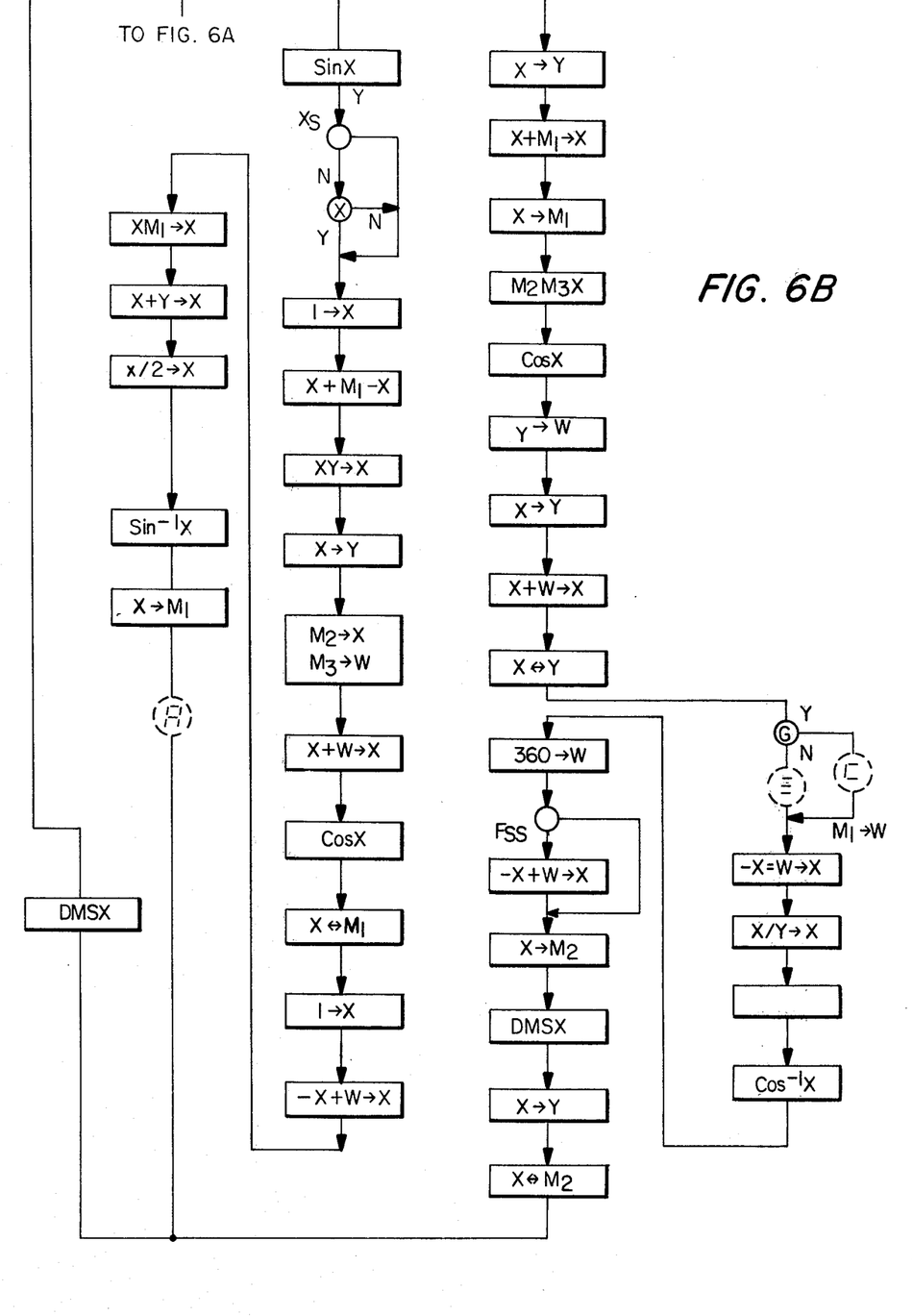

FIG. 5 is a detailed circuit diagram showing the display register X, the flag register F and its associated display decoder; FIG. 6 is a flow chart for explanation of execution of the above-said first fixed program; and FIG. 7 is a diagram showing the progress of execution of the first fixed program with showing the contents of the respective registers and the displaying results.

Figure 7A:
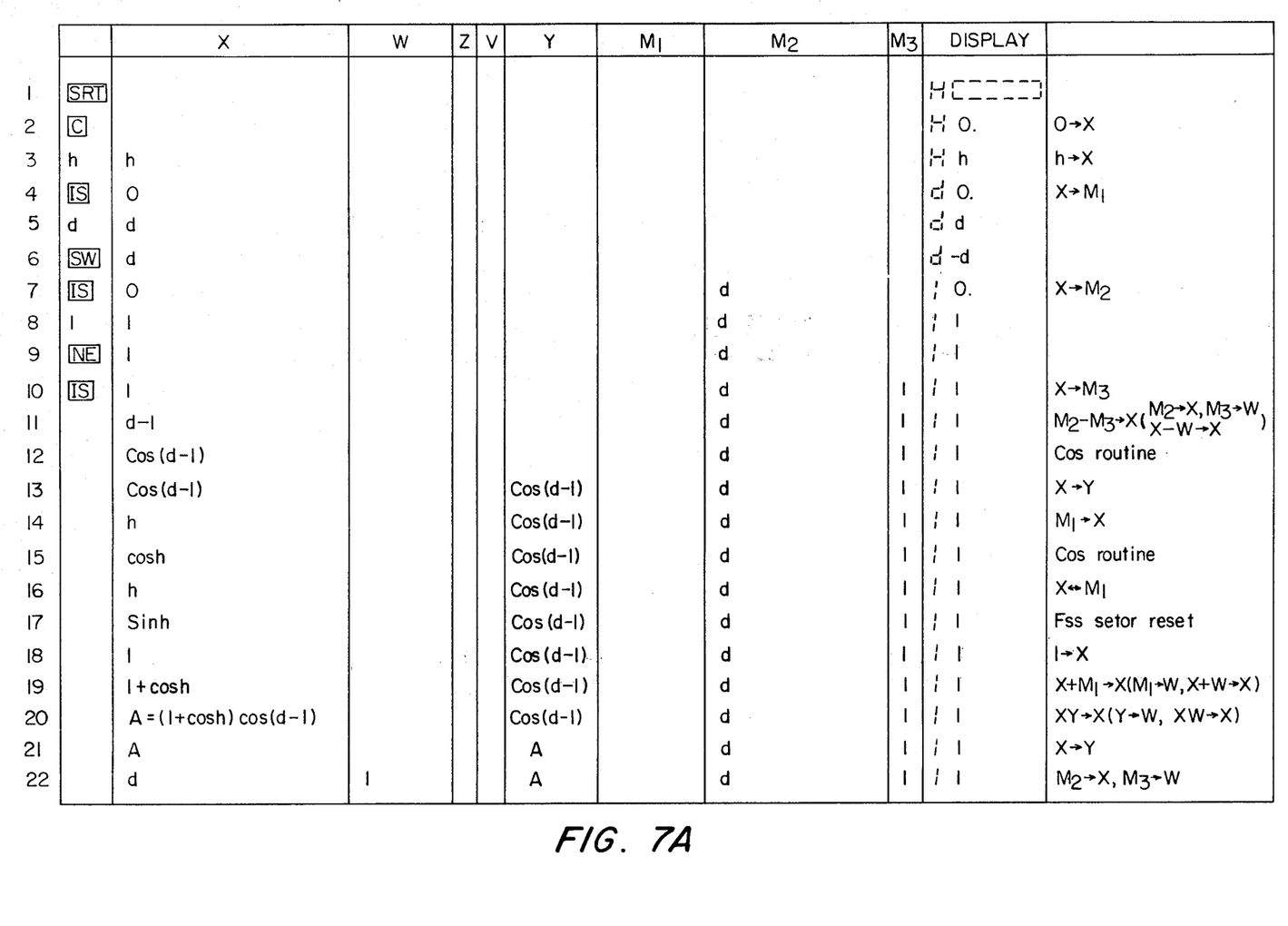
FIGS. 7A and 7B are tables illustrating the contents of respective registers and the results of a display while executing the specific fixed program calculation.
Figure 7B:
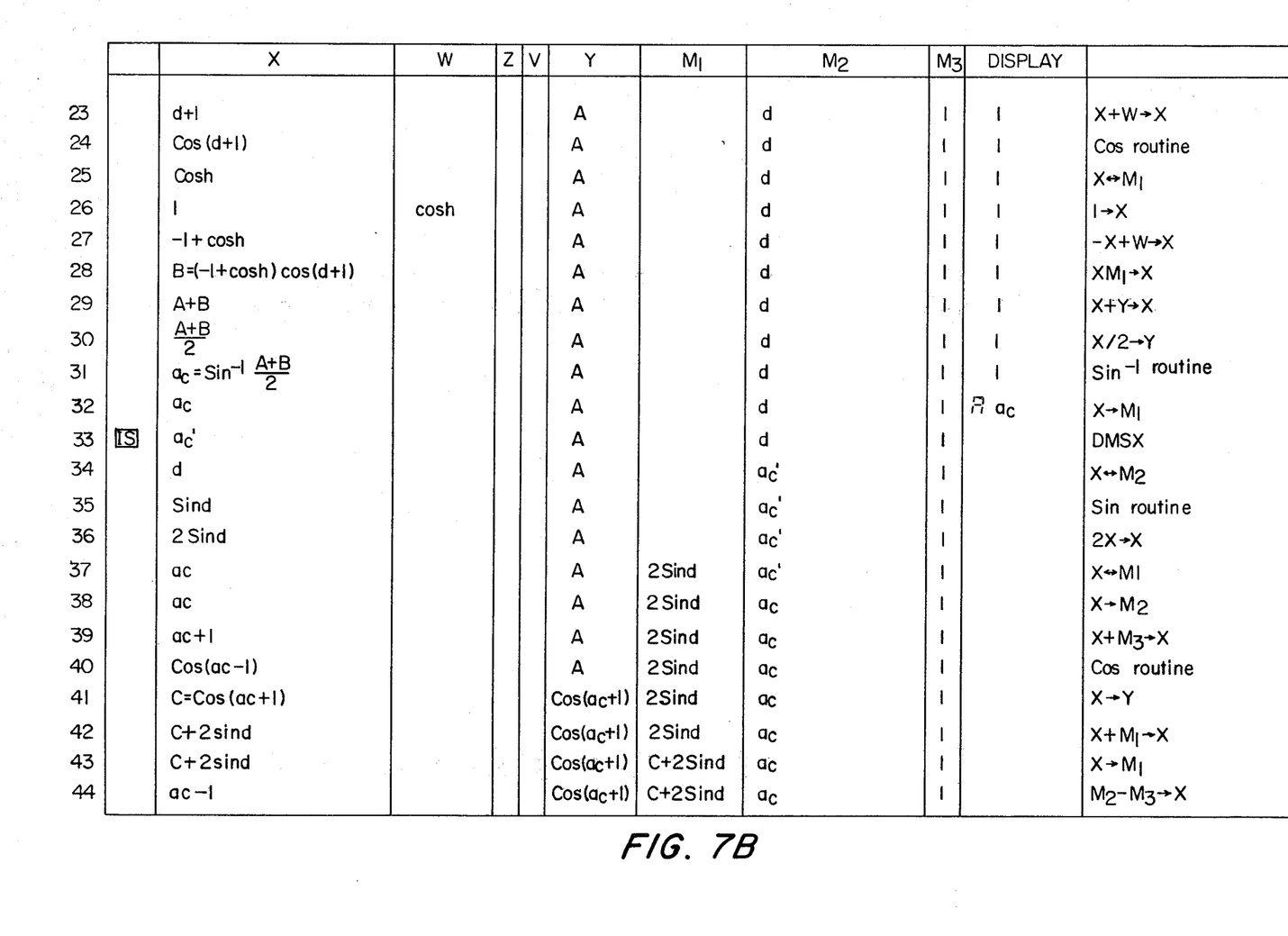
Figure 7C:
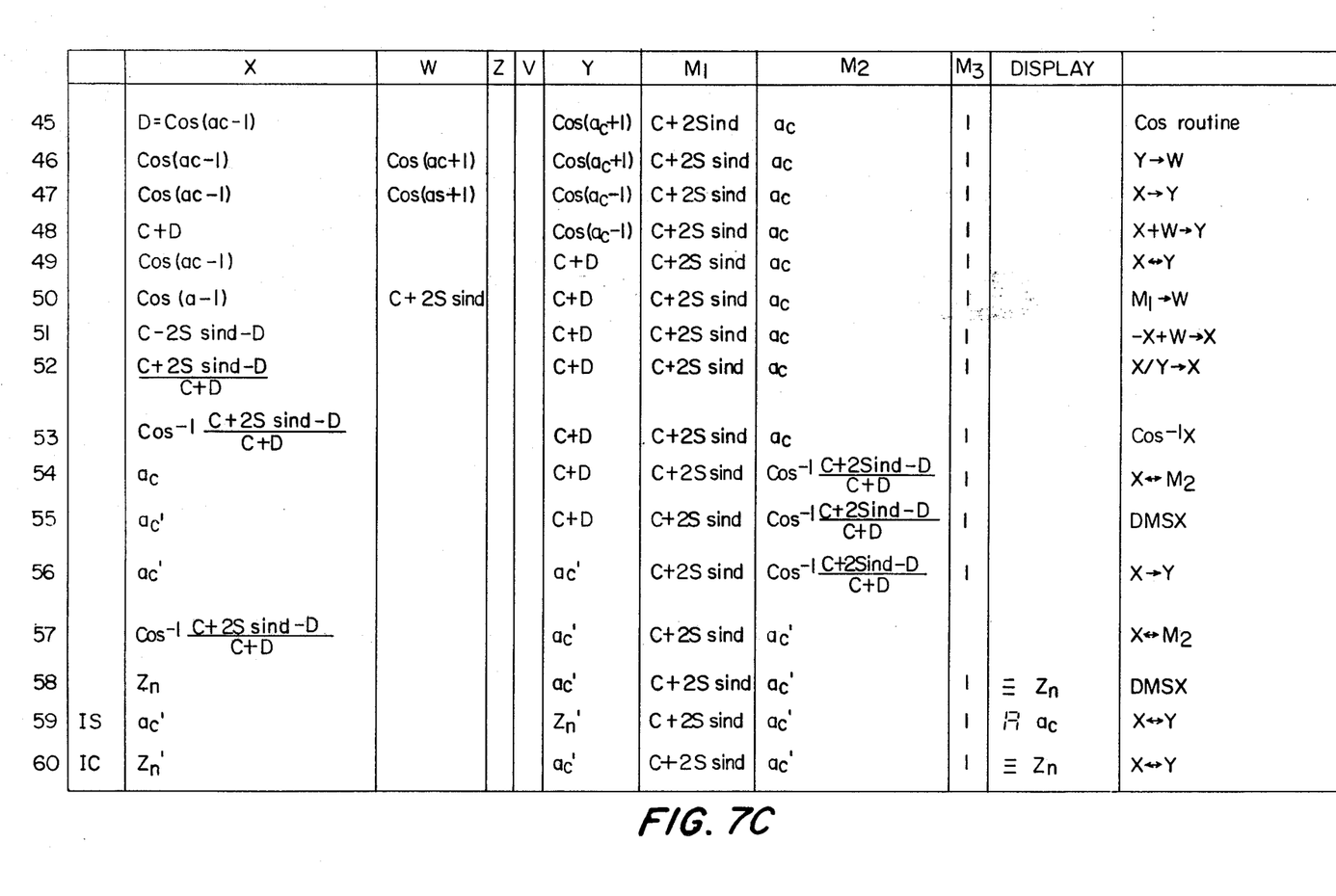

With reference to FIGS. 5 through 7, details of execution of the first fixed calculation program will be discussed to facilitate a understanding of the present invention.

As stated previously, the first fixed calculation program is designed to evaluate the most probable position (calculated altitude and azimuth) of a ship from input data items, that is, hour angle, declination, estimated latitude. The calculated altitude (ac) and the azimuth (Zn) can be represented as follows where h is the hour angle, d is the declination and the estimated latitude is l:

$$ac = \sin^{-1}(\cos h \cdot \cos d \cdot \cos l + \sin d \cdot \sin l)$$

-continued $$Zn = \begin{cases} Z & \sin h \leq 0 \\ 360° - Z & \sin h > 0 \end{cases}$$

where $Z = \cos^{-1}\left(\dfrac{\sin d - \sin ac \cdot \sin l}{\cos ac \cdot \cos l}\right)$ The position of the ship can be predicted almost exactly from the calculated altitude ac and the azimuth. In the given example of the navigation calculator, the calculation formula, the calculated altitude ac and the azimuth Z are rewritten as follows:

$$ac = \sin^{-1}\left(\dfrac{(\cos h + l)\cos(d - l) + (\cos h + l)\cos(d + l)}{2}\right)$$

$$Z = \cos^{-1}\left(\dfrac{2\sin d - \cos(ac - l) + \cos(ac + l)}{\cos(ac - l) + \cos(ac + l)}\right)$$

The flag register F contains at the eleventh digit position kinds of numeric information (including the input data items and the operation results) and coded signals ("0001" through "0111") representative of kinds of input data items to be next introduced in the form of its abbreviations. It contains at the tenth digit position coded signals representative of symbols and decimal point positions.

The coded signals representative of kinds of the displaying numeric information and abbreviations showing kinds of input data items to be next introduced into the calculator are identical with the coded signals representative of the numeric information itself as far as their code representation. A distinction between both is, therefore, required. A D-type flip-flop DIS is provided of which the outputs "1" and "0" are capable of distinction. The second digit position of the flag register F stores "1" at its most significant bit position as information effective to control that D-type flip-flop DIS. It should be understood that the respective digit positions of registers are composed of a plurality of bit positions (for example, four bits for each of digit positions).

In FIG. 5, the display register X has eleven digit positions and stores numeric information at its first digit positions through its eighth digit positions and carry information at its ninth digit position.

The flag register F has eleven digit positions and contains the above-said information at the most significant bit positions of its tenth digit position through its eleventh digit position and its second digit position. The remaining digits of the flag register F contain a variety of flag information. The outputs of the display register X is returned back into its most significant digit position via a circulation circuit and simultaneously applied to one input to an AND gate $G_1$. The other input to the AND gate $G_1$ receives signals $(\overline{T_{10} + T_{11}})$. $T_{10}$ and $T_{11}$ are digit time signals.

The outputs of the flag register F are fed back to its most significant digit position and applied to an input to an AND gate $G_2$ of which the other input receives signals $(T_{10} + T_{11})$. The outputs of the AND gates $G_1$ and $G_2$ are supplied to an input of an OR gate $G_3$, which in turn provides subsequently the outputs for buffer register stages $X_{04}$, $X_{03}$, $X_{02}$ and $X_{01}$. Upon the development of clock pulses $\phi_D(=t_4\phi)$ occurring at the final bit time $t_4$ of the digit time period, the outputs of the OR gate $G_3$ and the buffer stages $X_{04}$, $X_{03}$, $X_{02}$ are transferred respectively to $XF_4$, $XF_3$, $XF_2$ and $XF_1$.

Meantime, the outputs of the flag register F also are supplied to one input of an AND gate $G_4$ which receives digit time signals $T_2$ at the other input thereof. The outputs of the AND gate $G_4$ is applied as a set input to an RSS type flip-flop $F_0$ controlled by the clock pulses $\phi_D$. The RSS type flip-flop is a modification of conventional RS type flip-flops. The flip-flop $F_0$ receives at its reset input terminal digit time signals $T_{12}$. The outputs of the flip-flop $F_0$ are applied to an input of an AND gate $G_5$ which also receives digit time signals $T_{11}$. The outputs of the AND gate $G_5$ is applied to the input of the above-said D type flip-flop DIS controlled by the clock pulses $\phi D$. A decoder D forms segment selection signals SA, SB . . . SG in accordance with the outputs from the buffer registers $XF_4$ . . . $XF_1$ and the outputs of the D type flip-flop DIS.

First of all, the first fixed calculation program selection key $\boxed{SRT}$ is manually operated. This forces the flag flip-flop $N_2$ into the set state and the flag flip-flops $N_3$ and $N_4$ into the reset state. Under these circumstances, the most significant bit positions of the eleventh digit position and the second digit position of the flag register F receive "0010" and "1" from the read-only memory, respectively.

As clear from the circuit diagram of FIG. 5, " $H$ " is visually displayed at the eleventh digit position of the display, thereby indicating that an input data item to be initially introduced is about hour angle. Then, the key $\boxed{C}$ is depressed and hour angle information is introduced. As illustrated in FIG. 7, the display condition is " $H$ h" in this time.

Subsequently, the key $\boxed{IS}$ is operated. This forces the flag flip-flop IS into the set state. Because the flag flip-flop $N_2$ is in the set state and the remaining flip-flops $N_3$, $I_3$, $I_4$ and S are in the reset state, as illustrated in the flow chart of FIG. 6, the contents of the display register X are shifted into the temporary storage $M_1$ and "0001" are transmitted into the eleventh digit position of the flag register F, thereby clearing the display register X and returning to a read-in routine. Therefore, the display reads " $d$ 0", indicating that declination information is to be next introduced. The value of the declination d is entered and the key $\boxed{SW}$ designating the north latitude is manually operated. At this time, the display reads " $d$ -d" as illustrated in FIG. 7. The key $\boxed{IS}$ is again operated.

Therefore, the flag flip-flop $I_s$ is placed into the set state. Since the flag flip-flops S, $N_2$ are in the set state and the remaining flip-flops $N_3$, $N_4$, $I_3$ and $I_4$ are in the reset state, the contents of the display register X is shifted into the temporary register $M_2$ and "0011" is transmitted into the eleventh digit position of the flag register F as illustrated in FIG. 6, thereby clearing the display register X and being ready for entry of numeric information. The display provides a visual display of " $/$ 0", indicating that estimated latitude information is to be next introduced.

The value of the estimated latitude 1 is introduced and the key $\boxed{NE}$ designating the north latitude is manually depressed. As illustrated in FIG. 7, the display is displaying " $/$ 1" now. The key $\boxed{IS}$ depressed. The flag flip-flop $I_s$ is placed into the set state. The flag flip-flops $N_2$ and $I_4$ are in the set state, while $N_3$ S and $I_3$ are in the reset state.

As illustrated in the flow chart of FIG. 6, program steps following $X \rightarrow M_3$ are executed to evaluate the calculated altitude ac. The read-in routine is returned. At this time, the display displays "☆ ac" as illustrated in FIG. 7. The key [IS] is again depressed.

Then, the flag flip-flop $I_s$ is set. The flag flip-flops $N_2$, $I_4$ and S are in the set state, while $I_3$, $N_3$ and $C_1$ are in the reset state. The program steps following X↔$M_2$ as illustrated in FIG. 6 are executed to calculate the azimuth Zn. The calculator is ready for entry of the next succeeding information. As illustrated in FIG. 7, " ≡ Zn" is being displayed.

When depressing the key [IS], the flag flip-flop $I_s$ is set and the flag flip-flops $N_2$, $I_3$ and S are reset so that the contents of the display register X is substituted by the contents of the temporary register Y and "0100" is shifted into the eleventh digit position of the flag register F. The read-in routine is ready. Therefore, "$\overline{A}$ ac" is being displayed.

The key [IS] is repeatedly depressed and thus the flag flip-flop $I_s$ is set. Because of $N_2$ and $I_3$ in the set state and S in the reset state, the contents of the display register X is substituted by the contents of the temporary storage Y and "0101" is supplied to the eleventh digit position of the flag register F. The read-in procedure is ready. The displaying condition is " ≡ Zn". Thereafter, at every depression of the key [IS] "$\overline{A}$ ac" and " ≡ Zn" are alternatively displayed.

If in the given example the input data items are transmitted into a temporary storage at every depression of the key [IS], an interrupt calculation is possible when introducing the data items. In case where, for example, the declination is desired to be evaluated by means of any four-rule calculations, the [SRT] key, the [C] key, the introduction of the hour angle and the [IS] key are processed to calculate the declination. After that, the [SW] key and the [IS] key can be continuously depressed.

It is obvious that the present invention is applicable equally to calculators containing other kinds of fixed calculation programs and programmable calculators. The program selection keys may be of the self-holding type.

Figure 8:
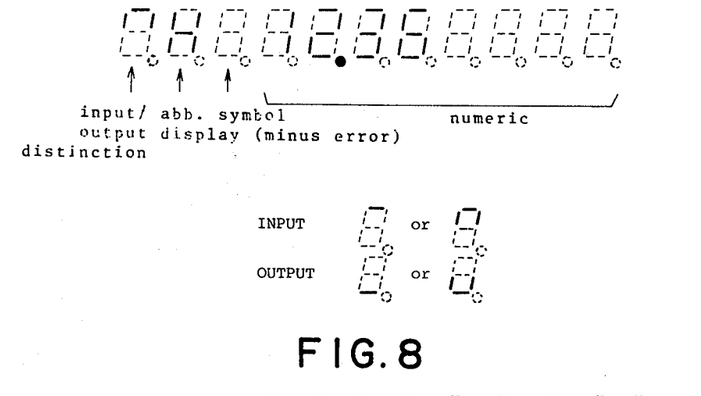
FIGS. 8 through 10 are diagrams for explanation of modifications of the present invention.
Figure 9:
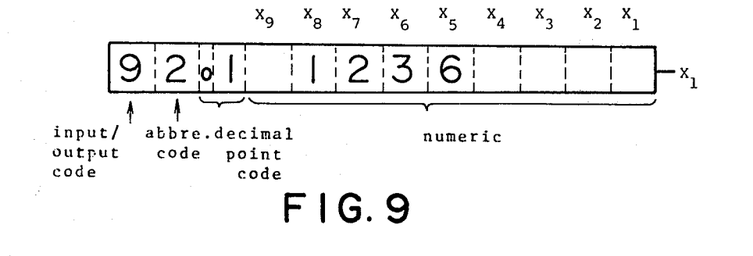

Although in the given example abbreviation display is carried out only for the displaying of numeric information (the input data, the operation results), as illustrated in FIG. 8, abbreviation display can be achieved as to whether the displaying numeric information is either input or output. This modification needs an additional one digit position of the flag register F adapted to store coded signals corresponding to an abbreviation representative of a distinction between the input and the output. In addition, while the flag register is separately provided with its specific digit position storing the coded signals corresponding to the abbreviations in the above-said example, as illustrated in FIG. 9, a specific digit position of the display register rather than numeric information storing digit positions can be arranged to store the coded signals corresponding to the abbreviations. These kinds of the input data items may be visually displayed in the form of numbers 0 through 9 instead of abbreviations. The segment type display may be substituted by other kinds of displays such as 8-segment type and 9-segment type.

Figure 10:
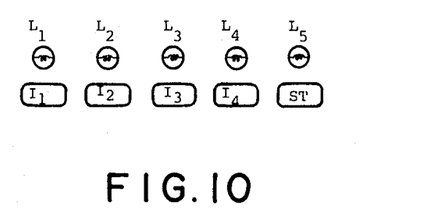

Moreover, as illustrated in FIG. 10, input keys [$I_1$] . . . [$I_4$] may be provided in accordance with the kinds of the input data items together with an additional calculation start key [ST]. For example, [SRT] mode can be accomplished by a sequence of the entry of the value of the hour angle h, the depression of the key [$I_1$], the entry of the value of the declination d, the depression of the key [$I_2$], the entry of the value of the latitude l, the depression of the key [$I_3$] and the depression of the key [ST]. $L_1$ . . . $L_5$ are lamps or light emitting diodes placed adjacent the respective keys [$I_1$] . . . [$I_4$], [ST].

It is claimed:

1. In a key-operated program calculator adapted to achieve a specific program calculation in response to a plurality of kinds of input data items introduced sequentially thereto, comprising:
an input data item display;
means for exhibiting various and different types of symbols on said input data display during successive stages of a computation;
said exhibiting means further comprising:
means for displaying symbols on said input data item display which represent types of data inputs that must be entered for processing during subsequent computations;
means for displaying different symbols on said input data display which represents types of data currently being entered for currently performing computations; and
means for displaying other different symbols on said input data item display which represent the results of a previously performed computation.

2. The invention as set forth in claim 1 wherein the input data item display is of the segment type.

3. The invention as set forth in claim 1, wherein said means for exhibiting various and different types of symbols on said data display during successive stages of a computation comprises:
a processor;
a judgement circuit providing information to and receiving commands from said processor;
a shift register region;
an adder/subtractor; and
a controller;
said processor providing electrical signals to said controller and to said judgement circuit, and receiving signal information from said judgement circuit;
said judgement circuit providing electrical signals to said controller, said adder/subtractor, and said processor and receiving signal information from said processor;
said adder/subtractor supplying electrical signals to said shift register region and receiving signal information from said controller and said judgement circuit;
said controller receiving electrical signals from said shift register region, said processor and said judgement circuit and supplying electrical signal information to said adder/subtractor; and
said shift register region receiving electrical signals from said adder/subtractor and supplying electrical signals to said controller means.

* * * * *